(12) United States Patent
Okazaki et al.

(10) Patent No.: US 6,386,637 B1
(45) Date of Patent: May 14, 2002

(54) SEAT STRUCTURE FOR VEHICLES

(75) Inventors: Hiroyuki Okazaki, Chiryu; Yukifumi Yamada, Toyota; Tatsuya Hattori, Nissin; Kousaku Taguchi, Toyota, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/404,469

(22) Filed: Sep. 24, 1999

(30) Foreign Application Priority Data

Sep. 24, 1998 (JP) ............................. 10-270004

(51) Int. Cl.[7] ................................. B60N 2/02
(52) U.S. Cl. ........................... 297/378.12; 297/354.13; 296/65.16
(58) Field of Search ............................ 297/378.12, 331, 297/335, 336, 440.1, 354.13, 367; 248/503.1; 296/65.03, 65.01, 65.16

(56) References Cited

U.S. PATENT DOCUMENTS

| 3,342,527 A | * | 9/1967 | Bercene ............ 297/354.13 X |
| 4,132,447 A | * | 1/1979 | Terada ............... 297/378.12 X |
| 4,874,205 A | * | 10/1989 | Arefinejad et al. .... 297/378.12 |
| 4,949,931 A | | 8/1990 | Fujiwara et al. |
| 5,383,710 A | * | 1/1995 | Premji .................. 297/378.12 |
| 5,429,415 A | * | 7/1995 | Meade .................. 297/354.13 |
| 5,482,349 A | * | 1/1996 | Richter et al. ...... 297/378.12 X |
| 5,542,745 A | * | 8/1996 | Takeda et al. ......... 297/378.12 |
| 5,558,403 A | * | 9/1996 | Hammoud et al. .... 297/378.12 |
| 5,570,931 A | * | 11/1996 | Kargilis et al. ...... 297/344.1 X |
| 5,904,404 A | * | 5/1999 | McCullogh et al. ... 297/378.12 |
| 6,039,401 A | * | 3/2000 | Rus ....................... 297/378.13 |
| 6,164,712 A | * | 12/2000 | Ajisaka et al. ...... 297/378.12 X |

FOREIGN PATENT DOCUMENTS

| JP | 63-137054 | 6/1988 |
| JP | 8-282352 | 10/1996 |

* cited by examiner

Primary Examiner—Peter M. Cuomo
Assistant Examiner—Stephen Vu
(74) Attorney, Agent, or Firm—Burns, Doane, Swecker & Mathis, LLP

(57) ABSTRACT

To maintain rigidity of a seat cushion frame at a seating position, an operating member (14) is axially supported pivotably by a lower arm (3) and a position of a wheel capable of pressing a floor is changed in accordance with a pivoting angle of the operating member (14).

5 Claims, 4 Drawing Sheets

SEAT STRUCTURE FOR VEHICLES

BACKGROUND OF THE INVENTION

The present invention relates to a seat structure for a vehicle, and particularly to a foldable or collapsible rear seat structure for the vehicle.

According to a rear seat for three passengers for a vehicle, as shown in FIG. 4, the rear seat is constructed such that a seat cushion frame 2 which is a constituent part of a seat cushion, is fixed to two pieces of rail devices 1 fixed to a floor of the vehicle and is constructed to include a seat back frame 4 which is a constituent part of a seat back supported by the seat cushion frame 2 via lower arms 3 installed on both sides at a rear portion of the seat cushion frame 2 and on the rear side of one of the rail devices 1.

Hinge devices 5 installed on the front side of the rail devices 1 enable to forwardly fold the seat and lock devices 6 installed at the rail devices 1 and the seat cushion frame 2 operate to fix the seat to the floor. An example of the lock device 6 is disclosed in Japanese Patent Laid-Open Publication No. 137054/1988.

Belt anchor points 7 are installed at the rail devices 1 and disperse load applied to seat belts toward the floor.

The load applied to the seat belt needs to be dispersed to the floor via the rail devices 1 and accordingly, an interval between the pair of rail devices 1 is restricted, a dimension of the three passenger rear seat in the width direction is considerably extended in side directions from the rail devices 1 and a problem in view of strength exists in this structure.

Further, the rail device 1 may be constituted by a lower rail fixed to the floor and an upper rail slidable with respect to the lower rail or may be constituted only by the lower rail. The seat cushion frame 2 and the seat back frame 4 may be coupled via a conventional reclining mechanism.

With regard to the extension of the three passenger rear seat in the transverse direction, for example, as disclosed in Japanese Patent Laid-Open Publication No. 282352/1996, lock devices locked to the floor may be installed also on both sides of the rear portion of the seat cushion frame to thereby maintain the rigidity.

However, in this case, the number of points of fixing the seat cushion frame to the floor by using the lock devices increases, and the increase in the fixing points may cause warp at the floor, further, considering synchronous locking performance of all the lock crevices, this is not necessarily regarded as preferable means.

SUMMARY OF THE INVENTION

Accordingly, the present invention is to overcome disadvantage of the above-described conventional structure.

In order to resolve the above-described problem, basically, the present invention provides means for arranging pressing members for pressing a floor at both side portions on the rear side of the seat cushion frame. Specifically, the present invention provides a seat structure for a vehicle constituted by installing pressing members which are installed at both side portions on a rear side of a seat cushion frame and pressed with respect to the floor by urging force of urging members.

According to the above technical conception, the pressing members are pressed to the floor whereby the rigidity of the rear cushion frame is ensured. At this occasion, the pressing members only press the floor and accordingly, there is no increase in the number of points of fixing the seat cushion frame to the floor by using lock devices.

DETAILED DESCRIPTION OF PREFERRED EMBODIMENTS

Figure 1:
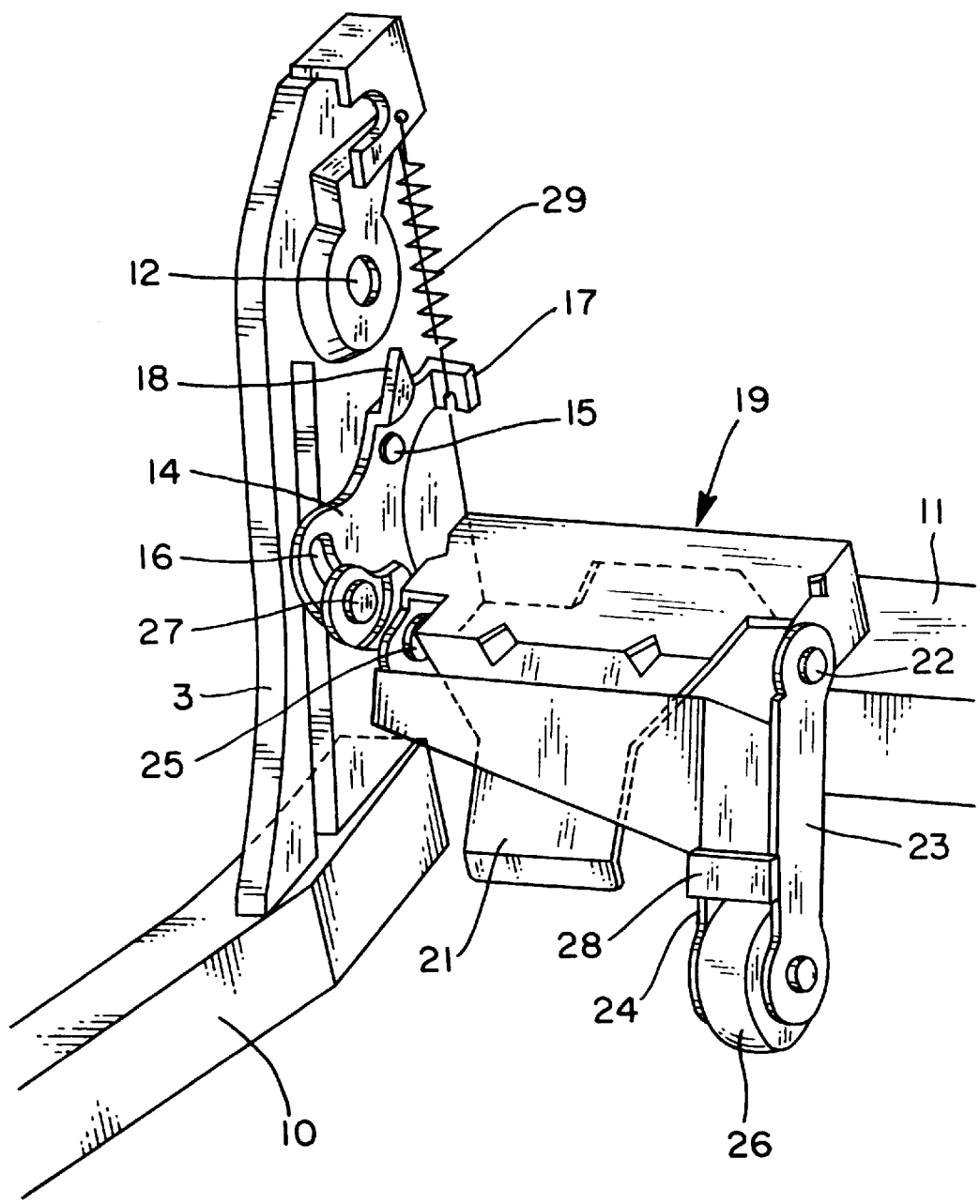
FIG. 1 is a perspective view of an example according to the invention.
Figure 2:
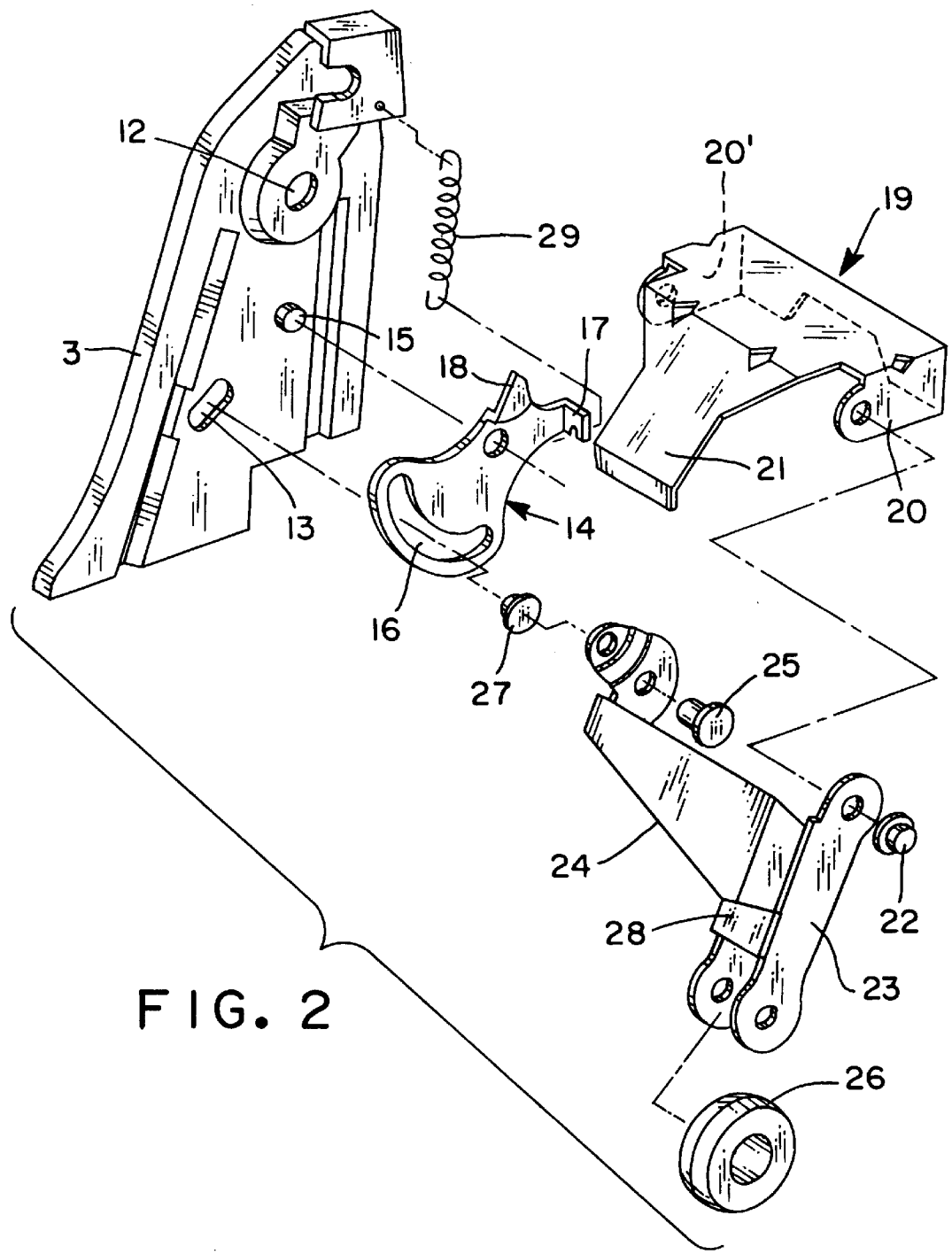
FIG. 2 is a disassembled perspective view of the example according to the invention.
Figure 3:
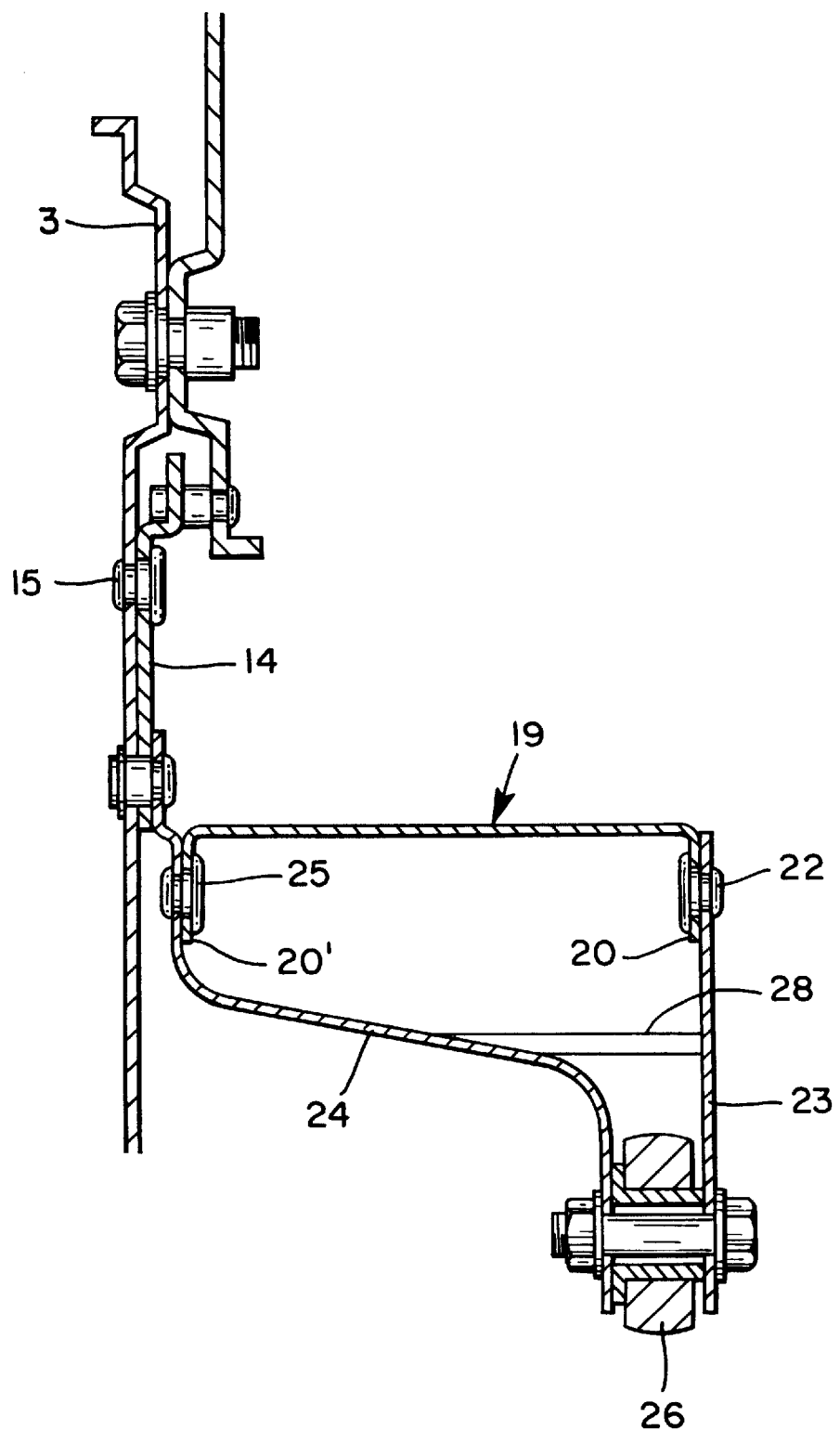
FIG. 3 is a front view of the example according to the invention.
Figure 4:
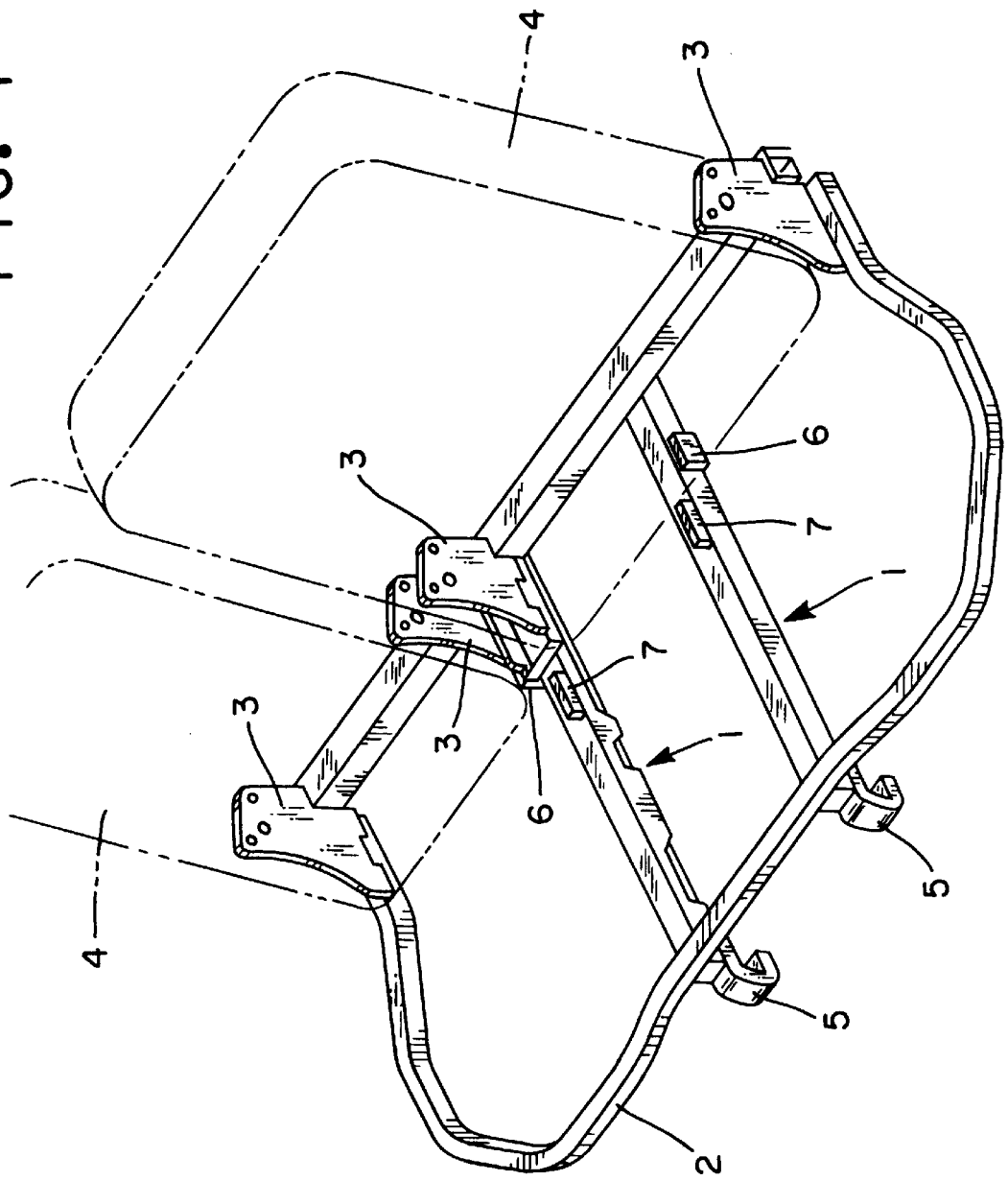
FIG. 4 is a perspective view showing a representative frame structure of a three passenger rear seat.

Although preferable embodiments are installed on both sides of the seat cushion frame 2 as shown in FIG. 4 respectively, an example of applying to the right side is illustrated in FIG. 1 and FIG. 2. A symmetrical constitution is arranged on the left side and accordingly, an explanation thereof will be omitted.

Further, the same members as those in the conventional structure are attached with the same numerals and an explanation thereof will be omitted.

Refer to FIG. 1 and FIG. 2. A lower portion of a lower arm 3 is fixedly attached to a vicinity of an intersection of a side member 10 and a rear member 11 of the seat cushion frame 2. The lower arm 3 is perforated with a pin hole 12 for coupling an upper arm (not illustrated), and a elongated hole 13 extended obliquely in a upper direction at its front lower portion.

The lower arm 3 supports an operating member 14 in a plate-like shape by using a pin 15 pivotably relative to the lower arm 3. The operating member 14 is provided with a cam hole 16 in a shape of a circular arc, a spring locking piece 17 and a seat back frame contact piece 18.

One end of a spring 29 is engaged with the spring locking piece 17 and other end thereof is fixed to an upper portion of the lower arm 3, and the operating member 14 is urged in the counterclockwise direction in view of FIG. 1.

A bracket 19 substantially in a box shape is fixedly attached to an end of the rear member 11 of the seat cushion frame 2. The bracket 19 is provided with separately opposed vertical wall portions 20 and 20' and a skirt portion 21 therebetween.

A first supporter 23 substantially in an I-like shape is axially supported by the vertical wall portion 20 of the bracket 19 on one side by using a pin 22. One end of a second supporter 24 substantially in an S-like shape is axially supported by the vertical wall portion 20' on the other side by using a pin 25. A small wheel 26 is attached between lower free end portions of the first and the second supporters 23 and 24.

A guide pin 27 is fixed to an upper end portion of the second supporter 24 and the guide pin 27 is extended to the elongated hole 13 of the lower arm 3 via the can hole 16 of the operating member 14. As a result, the second supporter 24 is pivoted around the pin 25 by changing the position of the guide pin 27 relative to the cam hole 16 and the elongated hole 13.

The two supporters 23 and 24 are coupled by a connection plate 28 and accordingly, movement of the second supporter 24 simultaneously pivots the first supporter 23. The movement of the two supporters 23 and 24 changes the position of the wheel 26 relative to the floor.

A state shown in FIG. 1 is a state in which by bringing down the seat back forwardly, the seat back frame 4 is made to push the contact piece 18 rearwardly, pivots the operating member in the clockwise direction, moves the guide pin 27 upwardly along the elongated hole 13, as a result, the two supporters 23 and 24 are pivoted in the clockwise direction around the pins 22 and 25 and the wheel 26 is floated up from the floor.

Under the state in which the seat back is brought down, the seat can be folded forwardly by erecting the seat cushion centering on the hinge devices 5 by operating the lock devices 6. Further, when the seat in the folded state is returned to a normal state, since the wheel 26 is floated up from the floor and accordingly, an operation for fixing the lock devices 6 to the floor can firmly be carried out.

When the seat back is returned to the seating position in the state of FIG. 1, contact of the seat back frame with the contact piece 18 is released and accordingly, by the urging force of the spring 29, the operating member 14 is pivoted in the counterclockwise direction and the guide pin 27 changes its position in compliance with the long hole 13 and the cam hole 16. Thereby, the two supporters 23 and 24 are pivoted in the counterclockwise direction centering on the pin 25 and the wheel 25 strongly presses the floor. In this way, the rigidity of the seat cushion frame is ensured.

Further, when the seat is moved in the forward and rearward direction, the wheel 26 per se rolls and assists movement of the seat.

As many apparently widely different embodiments of the present invention can be made without departing from the spirit and scope thereof, it is to be understood that the invention is not limited to the specific embodiments thereof except as defined in the appended claims.

What is claimed is:

1. A seat structure for a vehicle comprising:

pressing members installed at both side portions on a rear side of a seat cushion frame and pressed to a floor by an urging force of urging members, wherein each of the pressing members comprises supporting members pivotably supported by the seat cushion frame, a rolling member rotatably supported by the supporting members, and each of the urging members is a spring for urging the supporting members to pivot in a direction in which the rolling member is brought into contact with the floor;

lower arms installed at the both side portions on the rear side of the seat cushion frame for pivotably supporting a seat back frame such that the seat back frame can be brought down forwardly; and an operating member supported by each lower arm pivotably by receiving an urging force of the spring, connected to the supporting members and operated by pivoting the seat back frame in a direction of bringing down the seat back frame to thereby pivot the supporting members against the urging force of the spring.

2. The seat structure according to claim 1, further comprising:

rail devices arranged substantially at the center portion of the seat cushion frame in a seat width direction and adapted to be held by a floor via lock devices and hinge devices for supporting the seat cushion frame movably in a forward and rearward direction of the seat relative to the floor.

3. The seat structure according to claim 1, wherein the lower arm includes an elongated hole, the operating member includes a cam hole and the supporting members include a guide pin penetrating the elongated hole and the cam hole.

4. The seat structure according to claim 3, wherein pivotal movement of the operating member is transmitted to the supporting members via the guide pin.

5. The seat structure according to claim 1, wherein when the seat back frame is disposed at a seating position, the rolling member presses the floor and when the seat back frame is disposed at a position where the seat back frame is brought down forwardly, the rolling member is moved in an upper forward direction.

* * * * *